Oct. 22, 1963        J. B. KRIPKE ETAL        3,108,163
MAGNETICALLY OPERATED ROTARY MOTION DETECTOR
Filed Oct. 16, 1961

INVENTORS
Joseph B. Kripke &
BY David W. Turner

Paul J. Ethington
ATTORNEY

United States Patent Office 3,108,163
Patented Oct. 22, 1963

3,108,163
MAGNETICALLY OPERATED ROTARY
MOTION DETECTOR
Joseph B. Kripke and David W. Turner, Milwaukee, Wis., assignors to General Motors Corporation, Detroit, Mich., a corporation of Delaware
Filed Oct. 16, 1961, Ser. No. 145,395
3 Claims. (Cl. 200—61.46)

This invention relates to rotary motion sensors and more particularly to a device for switching electrical circuits in response to the angular velocity of a remote member.

In many instances it is desirable to provide an indication of the angular velocity of a remote member such as a machine shaft. The angular velocity of such a shaft might be dependent upon loading of the shaft, frictional characteristics, presence of lubrication and the condition of the power transmitting means between the shaft and its source of rotary power.

The present invention provides a simple and inexpensive device with relatively few moving parts to provide an indication of whether or not a remote shaft is rotating. This is accomplished through the use of permanent magnets, at least one of which is fixed to the rotating shaft and another of which is fixed to a movable contact member. The magnets are arranged such that a fixed magnetic field is established between the magnets when the shaft is at rest. The fixed magnetic field provides a force between the magnets which causes the movable contact member to move to a first predetermined position with respect to one or more electrical taps to switch one or more electrical circuits. Additionally, means are provided to return the movable contact member to a second predetermined switch position when the shaft rotation acts to disturb the fixed magnetic field.

In a preferred form of the present invention, a first magnet associated with a rotatable shaft and a second magnet associated with a movable contact member are positioned such that rotation of the shaft causes alternate forces of attraction and repulsion to exist between the magnets. Thus, the second magnet, and hence movable contact member will be displaced in an oscillatory manner through a predetermined distance by the alternate forces. This oscillatory displacement can be used to make and break contact between one or more external taps and the movable contact member. If the angular velocity of the rotating shaft exceeds a predetermined value such that the alternate forces of attraction and repulsion occur at a sufficiently high rate, the movable contact member will maintain an average position. In the average position, the switch provided by the movable contact member and the external taps will be in one condition. When the rotating shaft is at rest, the movable contact member will be displaced a fixed distance from the average position and will thus place the above-mentioned switch in a second condition.

The construction and operation of this invention will be more readily understood upon reading of the following specification taken with the accompanying drawings of which:

Figure 1:
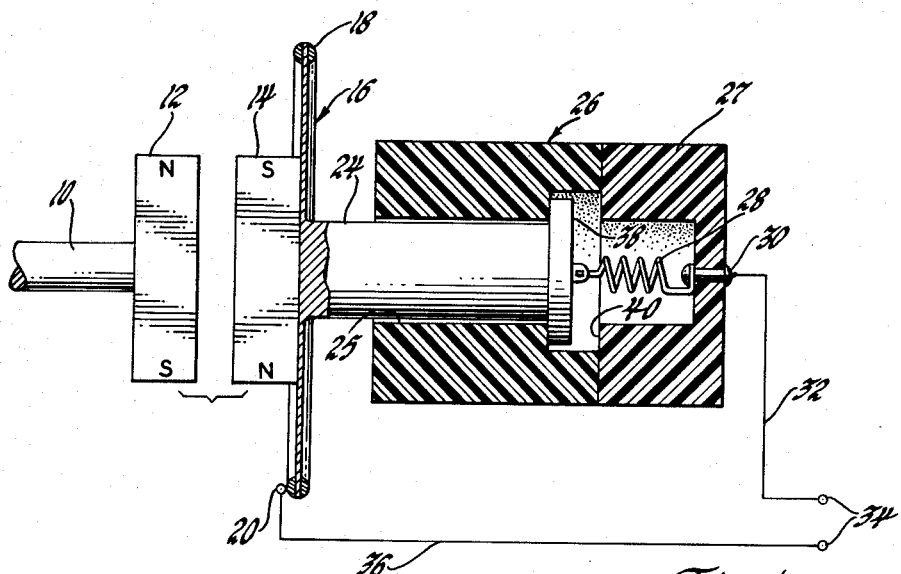
FIGURE 1 shows one form of the invention employing two permanent bar magnets.

Referring now to FIGURE 1 there is shown a particular form of the present invention employed to sense rotation of a shaft 10. In this embodiment, two permanent magnets 12 and 14 in the shape of rectangular bars are axially aligned to provide a fixed magnetic field when the shaft 10 is at rest. The magnet 12 is mounted upon the shaft 10 such that the longitudinal axis of the magnet 12 is perpendicular to the axis of rotation of the shaft 10. The magnet 14 is fixed to a movable annular contact ring 16. Positioned adjacent to but spaced from the periphery 18 of the contact ring 16 is a tap 20 which completes a circuit between terminals 34 when in contact with the contact ring 16. The contact ring 16 is fixed to a cylindrical plunger member 24 which is composed of conductive material and which moves within the cylindrical interior 25 of the non-conductive housing 26. Connecting the plunger member 24 and the non-conductive cup member 27 of the housing 26 is a conductive spring 28 which acts to regulate the position of the plunger member 24 within the housing 26. The spring 28 is connected in such a manner as to be capable of exerting a torsional as well as a tensional force on the plunger member 24. The spring 28 is fixed to the cup member 27 by means of a conductive rivet 30. The rivet 30 forms part of a conductive circuit which also includes a conductor 32 between the spring 28 and one of the terminals 34. The other of the terminals 34 is shown connected to the tap 20 by means of a conductor 36.

It can be seen that when the magnets 12 and 14 are axially aligned with opposite poles of the magnets in proximity as shown in the drawings, a force of attraction will exist between the magnets 12 and 14. This force of attraction is sufficient to work against the tension force of the spring 28 to displace the plunger 24 and the contact ring 16 such that the annular periphery 18 thereof comes into contact with tap 20 thus completing the electrical circuit between the terminals 34. The electrical circuit will then be defined by one of the terminals 34, the conductor 32, the rivet 30, the conductive spring 28, the conductive plunger member 24, the annular contact ring 16, tap 20 and the conductor 36 which completes the circuit to the other of the terminals 34. It is clear that the apparatus may also be designed such that the circuit between terminals 34 is opened when the magnets 12 and 14 are aligned as shown in the drawing, by placing the tap 20 on the opposite side of the contact member 16.

As previously stated, a torsional force, as well as a tensional force, is provided by the spring 28. Therefore, the plunger member 24 is rotatable within the housing 26 over an angular displacement determined by the balance between the attractive magnetic force and the torsional force of the spring 28. The allowed angular displacement of the plunger 24 is preferably on the order of 180°. This is to allow the magnet 14 to align with the magnet 12 when the shaft 10 is at rest such that opposite poles are in proximity regardless of the orientation of the magnet 12. Thus it can be seen that at such time as the shaft 10 is at rest, the magnets 12 and 14 will be aligned as shown in the drawing and a force of attraction will exist between the magnets to complete the previously defined electrical circuit between terminals 34. A suitable indicating means such as a D.C. battery and a lamp filament may be connected to the terminals 34. If this were the case, the indicating lamp would be lighted whenever the shaft 10 was at rest. If the shaft 10 were to be at rest at some time when it was expected to be rotating at or above a predetermined speed, a continuous flow of energy to the indicating lamp by means of the completed circuit between terminals 34 would provide an indication of malfunction which could immediately be investigated.

Considering now the operation of the apparatus shown in FIG. 1, as power is applied to the rotatable shaft 10 and it begins to rotate, the magnet 14 initially rotates with the magnet 12 over such a displacement as is allowed by the torsional force of the spring 28. Once the angular displacement limit has been exceeded by the magnet 12, a relative rotation between the magnets 12 and 14 exists. This relative rotation naturally causes the fixed magnetic field between the magnets to be disturbed. As the north pole of magnet 12 rotates away from the south pole of magnet 14, the force of attraction decreases and the tensional force of the spring 28 causes the plunger member 24 to be displaced to the right, that is, into the housing 26. As magnet 12 continues to rotate, the attractive force between the magnets becomes a force of repulsion tending to displace the plunger member 24 farther into the housing 26. The displacement of the plunger member 24 will be limited by the interaction of the surface 38 of the plunger member and the surface 40 of the housing. When these surfaces 38 and 40 meet, the electrical circuit between terminals 34 is open since the periphery 18 of the annular contact ring 16 no longer touches tap 20. It can be seen that if the shaft 10 is rotated very slowly, alternate forces of attraction and repulsion exist between the magnets 12 and 14 and thus the plunger member 24 is displaced in an oscillatory manner, causing the intermittent contact between the annular contact ring 16 and the tap 20. If, as previously was the case, the terminals 34 are connected to a suitable light source, an intermittent flashing of the light indicates a slow rotation of the shaft 10. Therefore, while a continuous burning of the light indicates that the shaft 10 is at rest, an intermittent burning of the light may indicate that the shaft 10 is rotating below a predetermined angular velocity. This angular velocity may be predetermined by a calculation of the inertia forces acting upon the assembly of the plunger member 24, the magnet 14 and the contact ring 16, and a suitably chosen spring constant.

As the shaft 10 comes up to and exceeds a predetermined angular velocity, the forces of attraction and repulsion between the magnets 12 and 14 will occur at such a rate that the plunger member 24 will substantially assume an intermediate position within the housing 26 as determined by the constant of the spring 28. In this condition, the inertia of the assembly of the plunger member 24, magnet 14, and the contact ring 16 is such that the oscillatory displacement of the assembly is not sufficient to cause the previously mentioned intermittent contact between the periphery 18 of the contact ring 16 and the tap 20. Since the electrical circuit between the terminal 34 is now continuously open, the absence of an indication from a suitable indicating means tells the operator of this device that the shaft 10 is rotating at a satisfactory speed.

Figure 2:
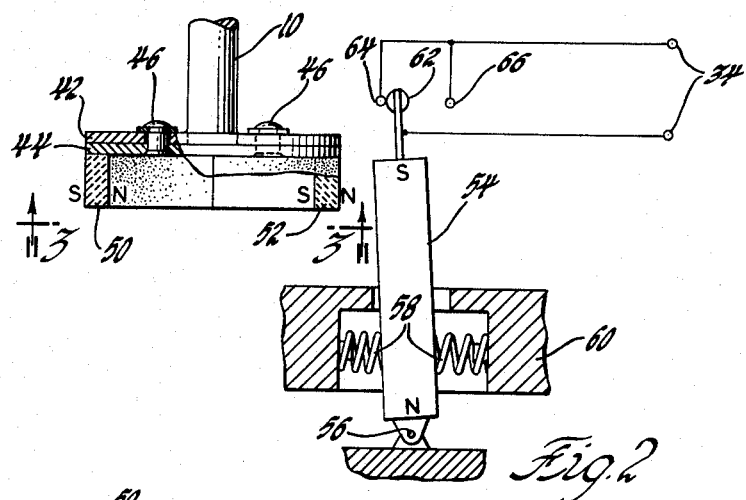
FIGURE 2 is an alternative form of the present invention.
Figure 3:
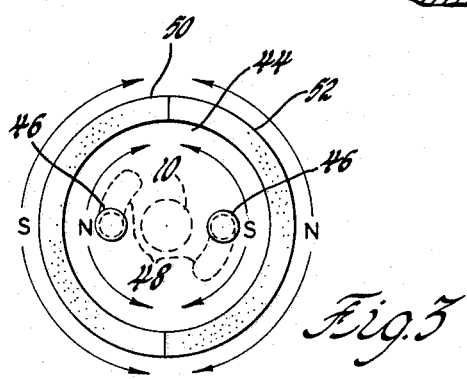
FIGURE 3 is an end view taken along a line 3—3 of FIGURE 2.

FIGURE 2 shows an alternative form of the inventive rotary motion sensor which is designed to switch a circuit between the output terminals 34 according to the rotary motion of the shaft 10. Fixed to the shaft 10 is a round end plate 42 whose plane of rotation is perpendicular to the axis of the shaft. A second end-plate 44 is fixed to the end-plate 42 by means of bolts 46 and the arcuate slots 48. The slots 48 are to allow a small relative displacement to occur between the end-plates 42 and 44. Mounted on the end-plate 44 are two arcuate permanent magnets 50 and 52. The magnets 50 and 52 are magnetically oriented such that the outer surface of the magnet 50 forms a continuous south pole and the outer surface of magnet 52 forms a continuous north pole as indicated in FIGURE 3. The inner surface of magnets 50 and 52 are then north and south poles, respectively. The magnets 50 and 52, which may be composed of a ceramic material, form arcs of substantially 180°. Thus an external magnetic pole located near the periphery of the end-plate 44 would experience alternate and equal periods of attraction and repulsion as the shaft 10 is rotated at a constant speed. It is possible that a small air gap may exist between the magnets 50 and 52. However, this air gap should be kept as small as possible to avoid an irregularity in the external magnetic field.

The aforementioned external magnetic pole takes the form of the south pole of a pivotally-mounted permanent bar magnet 54. The north pole of the magnet 54 is pinned to a pivot point 56 such that the south pole of the magnet 54 is free to be displaced toward or away from the outer surfaces of magnets 50 and 52. A pair of centering springs 58 are attached to the magnet 54 and to a housing 60 to maintain the magnet 54 in a central position when the external forces acting upon the magnet 54 are in relative equilibrium. Connected to the south pole of the magnet 54 is an electrical contact or tap 62 which is adapted to engage with a pair of adjacent electrical taps 64 and 66 to complete a circuit between the terminals 34. Although the taps 64 and 66 are shown connected to a common terminal 34, it is contemplated that the taps 64 and 66 may be connected to separate terminals in respective circuits.

Considering the operation of the apparatus shown in FIGURE 2, if the shaft 10 is initially at rest, the south pole of magnet 54 will be in proximity to the outer surface of either magnet 50 or 52. If, for example, the shaft 10 is angularly positioned such that the south pole of magnet 54 is opposite the outer surface of magnet 52, a force of attraction will exist therebetween and cause a counterclockwise displacement of magnet 54 as shown in the drawing. This force of attraction will act against the centering springs 58 and will cause tap 62 to come in contact with tap 64 thus completing the circuit between terminals 34. If the outer surface of magnet 50 is in proximity to the south pole of magnet 54, a force of repulsion will exist thus causing a clockwise rotation of magnet 54 and the circuit between terminals 34 will be completed by means of taps 62 and 66. From the above description, it can be seen that the magnet 54 may be pivoted from either pole with the result being essentially the same in either case.

As the shaft 10 begins to rotate, the magnet 54 will begin to oscillate whereby tap 62 will alternately contact taps 64 and 66 at a rate dependent upon the angular velocity of the shaft 10. As the angular velocity of the shaft 10 continues to increase, the magnet 54 will experience an increasing rate of oscillation until the magnitude of the displacement of magnet 54 is less than that required to provide a contact between the taps 62 and 64 or 66. The centering springs 58 will then maintain the magnet 54 in essentially a central position whereby the circuit between terminals 34 is opened. As previously described, a suitable source of indication attached to the terminals 34 will provide an operator with information enabling him to determine whether or not the shaft 10 is rotating at or above a predetermined desired angular velocity.

Further considering the operation of the system of FIGURES 2 and 3, the operator applies the power to the rotatable shaft 10 and first observes an intermittent signal from the indicator attached to terminals 34, this signal obtaining as the shaft 10 is rotated at an angular velocity less than the predetermined angular velocity required to maintain the magnet 54 in essentially the central position. As the shaft 10 attains the desired speed the aforementioned indicating device shows no reading. In the case of a malfunction, the shaft 10 would normally experience a decrease in angular velocity and thus the intermittent signal would again appear to warn the operator of the forthcoming cessation of rotation. As the shaft 10 comes completely to rest, the arcuate slots 48 of FIGURE 3 allow some freedom of movement of the end plate 44 so the possibility of a dead center alignment of magnets 50 and 52 with respect to magnet 54, thereby causing a false indication at terminals 34, is eliminated.

It is to be understood that the embodiments illustrated herein are not to be considered in a limiting sense, but that various modifications and alterations may be made without departing from the inventive principle of this device. For example, the magnets shown mounted on the end of the rotatable shaft but could easily be mounted at a central point on the shaft to provide the same result. Similarly, modifications are also possible to the configurations of the magnets involved, or to the resilient means used to maintain the switching magnet in a central position, or to the external taps in order to complete a plurality of electrical circuits. For a definition of the invention reference should be made to the appended claims.

We claim:

1. Apparatus to sense rotary motion including a rotatable member, a first permanent magnet fixed to the rotatable member and rotatable therewith, a second permanent magnet positioned relative to the first magnet such that alternate forces of attraction and repulsions occur between the magnets at a rate dependent upon the angular velocity of the rotatable member, the second magnet being displaceable with respect to the first magnet over a predetermined distance, positioning means including an annular first contact member attached to the second magnet and displaceable therewith, resilient means attached to the positioning means and to a position-reference point tending to resist displacement of the second magnet from a predetermined position, the positioning means being rotatable through a predetermined angular distance thereby allowing the second magnet to attain a particular position relative to the first magnet when the first magnet is at rest regardless of the angular position of the first magnet, a fixed second contact member positioned adjacent the first contact member and adapted to complete an electrical circuit by contacting the first contact member, the contact being effected responsive to the second magnet being displaced through the predetermined distance, the resilient means being effective to limit the displacement of the second magnet to less than the predetermined distance while the rotation of the rotatable member exceeds a particular angular velocity.

2. Switching apparatus responsive to the angular velocity of a rotatable member including a rotatable member, first and second arcuate permanent magnets disposed upon the rotatable member parallel to the plane of rotation and centered about the axis of rotation of the rotatable member, a third permanent magnet positioned relative to the rotating member such that one pole of the third magnet is alternately in proximity to opposite poles of the first and second magnets at a rate dependent upon the angular velocity of the rotatable member, the other pole of the third magnet being pivotally supported such that the third magnet is displaceable through an arc of predetermined length about a central position, resilient means attached to the third magnet tending to resist displacement of the third magnet from the central position, a first electric tap attached to the third magnet and displaceable therewith, second and third electrical taps positioned about the first tap such that displacement of the third magnet through the arc of predetermined length causes the first tap to contact either the second or third tap according to the direction of the displacement, thereby completing respective electrical circuits, the resilient means being effective to essentially maintain the third magnet in the central position when the angular velocity of the rotatable member causes the polarity change between the magnets to occur at or above a predetermined rate.

3. A device for sensing rotary motion including a rotatable member, first permanent magnet means fixed to the rotatable member and rotatable therewith to alternately present magnetic poles of opposite polarity to a fixed reference point adjacent the rotatable member, the rate of presentation being related to the angular velocity of the member, displaceable second permanent magnet means normally disposed at the fixed reference point but responsive to the poles of the first magnet means to be displaced therefrom by forces of magnetic attraction and repulsion, means to effect a relatively displaceable relationship between the first and second permanent magnet means such that said magnet means may be relatively displaced over a predetermined range independently of rotation of said member to thereby prevent said member from coming to rest in a position wherein the net magnetic force between the magnet means is zero, and circuit means including a first tap carried by the second magnet means and a second tap positioned adjacent the first tap to be contacted thereby when the second magnet means is displaced sufficiently by said forces.

References Cited in the file of this patent

UNITED STATES PATENTS

| | | |
|---|---|---|
| 2,518,138 | Goss et al. | Aug. 8, 1950 |
| 2,577,165 | Thorsheim | Dec. 4, 1951 |
| 2,804,515 | Heggen | Aug. 27, 1957 |
| 2,915,606 | Knauth | Dec. 1, 1959 |
| 3,012,157 | Baring et al. | Dec. 5, 1961 |